(No Model.)

J. G. AVERY.
ANTI-FRICTION BEARING.

No. 287,215. Patented Oct. 23, 1883.

WITNESSES
Wm A. Skinkle
Geo. W. Young

INVENTOR
John G. Avery.
By his Attorney
Jas. L. Ewin.

UNITED STATES PATENT OFFICE.

JOHN G. AVERY, OF SPENCER, MASSACHUSETTS.

ANTI-FRICTION BEARING.

SPECIFICATION forming part of Letters Patent No. 287,215, dated October 23, 1883.

Application filed April 13, 1883. (No model.)

*To all whom it may concern:*

Be it known that I, JOHN G. AVERY, a citizen of the United States, residing at Spencer, in the State of Massachusetts, have invented a new and useful Improvement in Anti-Friction Bearings, of which the following is a specification.

This invention is additional to my improvement in anti-friction bearings described and claimed in Letters Patent No. 267,991, dated November 28, 1882, and relates, primarily, to the adaptation of my "long-roll shells" to axle-boxes and the like, of small diameters as compared with line-shafting, for which the bearing shown in said Letters Patent was designed. In the construction of these long-roll shells I aim to avoid unnecessary multiplication of rollers, and thus to simplify and cheapen the bearings. A sufficient number of rollers to afford more or less numerous bearing-points around the spindle or shaft is necessary, however. Consequently small rollers become requisite in bearings of reduced diameter. Now, rollers small enough for an ordinary axle-box, for example, if made long enough for use in a single series, as described in said Letters Patent No. 267,991, will in practice "spring" and become inoperative; but I have discovered that they may be advantageously used in only two series, and by locating these at the respective ends of a rigid shell the rollers may be shortened to about one-third of the length of the shell, with a material saving in cost of construction, and no corresponding disadvantages. A long-roll shell of peculiar construction so provided with small "hardened" rollers in two series, located at its respective ends, in combination with cylindrical hardened surfaces concentric with the shell, constitutes the first part of my present invention.

This invention consists, further, in peculiar means for reducing the noise or "rattling" of the shell in operation, and peculiar means for reducing the unavoidable friction at the ends of the shell, as hereinafter more fully set forth.

A sheet of drawings accompanies this specification as part thereof.

Figure 1:
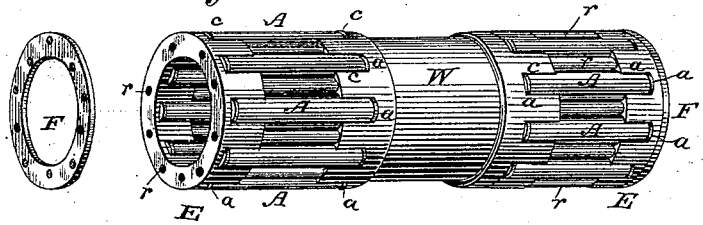
Figure 2:
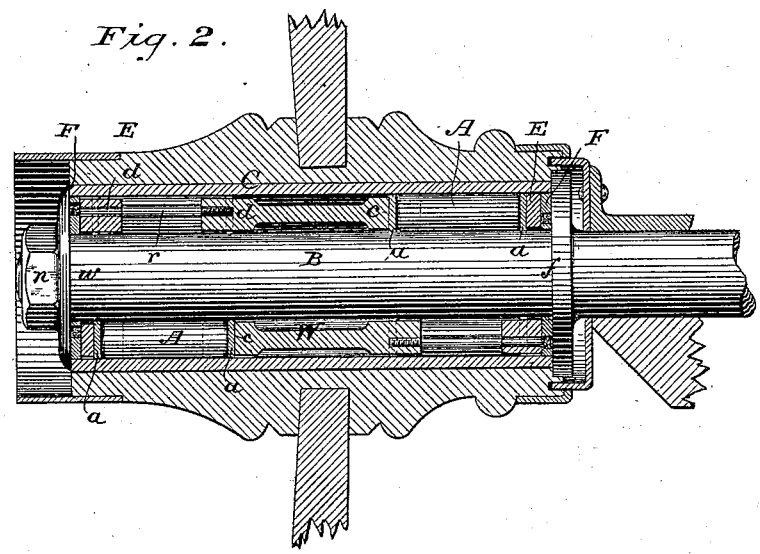
Figure 3:
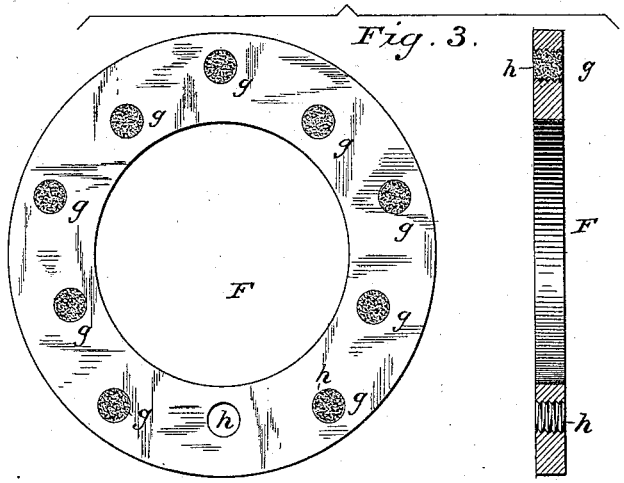

Figure 1 is a perspective view of my new long-roll shell with its anti-rattlers and anti-friction end washers. Fig. 2 represents a central longitudinal section through an axle-box provided therewith, and Fig. 3 represents a face view and transverse section of one of the said end washers enlarged.

Like letters of reference indicate corresponding parts in the several figures.

A A, Figs. 1 and 2, represent uniform journalless hardened rollers, constructed as heretofore, in the shape of smooth cylinders, with ends "rounded" to preclude cutting. These are preferably made from rod-steel cut to a given gage, so as to be interchangeable, and hardened.

B, Fig. 2, represents a specially-formed axle-spindle, having a hardened cylindrical surface to coact with the said rollers. Instead of this, a tight sleeve provided with a like hardened surface may be fitted to an ordinary spindle or shaft.

C, Fig. 2, represents an outer cylindrical shell having an internal hardened surface to coact with said rollers, and forming, in the example, the lining of a carriage-hub. This shell may instead be fitted within a loose pulley or the like, or within a pillow-block, for example; or metallic hubs, pillow-blocks, &c., may be simply bored, so as to be true and of the proper internal diameter, and surface-hardened internally by any approved process. The said long-roll shell serves to locate two series of such hardened rollers A between such hardened surfaces, and to keep them parallel with each other and with the axis of said surfaces, at uniform distances apart in the respective series, and secure against endwise displacement, besides uniting said rollers A and the "anti-rattlers" *a*, so that they may be handled, inserted, and withdrawn as one part, as illustrated by Figs. 1 and 2. Apart from said rollers and anti-rattlers, said long-roll shell consists of a central casting or waist-piece, W, and two end rings, E E, of brass, with shouldered iron tie-rods *r* between and parallel with the rollers of the respective series. Said waist-piece has at each end equidistant uniform cells *c*, to retain and properly expose the ends of the rollers, with intermediate screw-tapped drill-holes, *d*, to receive the inner shouldered ends of said tie-rods *r*, the latter being screw-threaded to match. Between its recessed ends the waist-piece is made thin, as shown, to reduce its weight to the minimum. The said roller-cells in each end of the waist-piece are by preference located opposite the rod-holes in the other end, so that the rollers of the respective series shall not be in line with each other; but this is not considered essential. The end rings, E, are alike in construction, having roller-cells $c$, matching those of said waist-piece, and intermediate smooth drill-holes, $d$, to receive the outer shouldered ends of said tie-rods.

In assembling the parts, tie-rods $r$ are tightly screwed into all the rod-holes in one end of the waist-piece W, the latter being held in a suitable clamp. A set of the anti-rattlers $a$ are then dropped into the cells between, followed by a set of the rollers A. Another set of the anti-rattlers are applied to the outer ends of the rollers, and an end ring, E, is then applied to the outer ends of the rods and rollers and driven home, being stopped by the shoulders on the former. The parts which complete the other end of the shell are added in like manner. The escape of the rollers and anti-rattlers is now precluded, while the former are exposed throughout their length, and are loose enough to rotate freely. The said anti-rattlers $a$ consist of small circular disks of compressed leather, or any other suitable substance of the same diameter as the rollers, accommodated within the roller-cells $c$, at the respective ends of each roller. They reduce noise in operation to a material extent, and are added at a trifling additional cost. At the respective ends of the long-roll shell anti-friction washers F F are introduced within the outer shell of the bearing, as shown in Figs. 1 and 2, to reduce the slight friction unavoidable at these points. These washers are made of brass or gun-metal. They are fitted to their said locations, and, as best illustrated by Fig. 3, are provided with screw-tapped holes $h$, (one of which is shown empty in each of the views in Fig. 3,) drilled irregularly or near the inner edge and near the outer edge alternately, perpendicular to the faces of the washers. Finally, these holes $h$ are provided with graphite fillings $g$, which sufficiently lubricate the faces of the washer in use. In forming said fillings, powdered graphite is mixed with glue into a plastic mass, with which the holes $h$ are filled. The mixture soon sets or hardens, and the washers are then ready for use, the fillings $g$ being securely retained by the screw-tapped holes.

Assembled within an axle-box, as shown in Fig. 2, the parts above described may be confined between the customary axle collar or flange, $f$, and an outer washer, $w$, by means of the customary nut or nuts, $n$, or by any preferred means, the said anti-friction washers F coacting with said flange and outer washer and with the long-roll shell between.

Having thus described my said invention, I claim as new and desire to patent under this specification—

1. In an anti-friction bearing, the within-described long-roll shell, having a waist-piece, W, and a pair of end rings, E E, constructed with roller-cells and drill-holes, and rigidly united by shouldered tie-rods $r$, in combination with journalless rollers A, of hardened metal, located and confined in two series by means of said roller-cells, and inner and outer hardened surfaces concentric with said shell, to coact with said rollers, substantially as herein specified, for the purposes set forth.

2. The within-described anti-rattlers $a$, arranged within roller-cells $c$, substantially as shown, in combination with journalless anti-friction rollers, for the purpose specified.

3. The anti-friction washers F, of brass or gun-metal, provided with graphite fillings $g$ in screw-tapped holes $h$, perpendicular to the respective faces of each washer, in combination with a shell containing anti-friction rollers, and the surfaces between which said shell is confined longitudinally, substantially as herein described.

JOHN G. AVERY.

Witnesses:
GEORGE G. WRIGHT,
J. J. DUSTIN.